US010021659B2

(12) United States Patent
Rode et al.

(10) Patent No.: US 10,021,659 B2
(45) Date of Patent: Jul. 10, 2018

(54) SYNCHRONIZATION OF DISTRIBUTED NODES IN WIRELESS SYSTEMS

(71) Applicant: Ziva Corporation, San Diego, CA (US)

(72) Inventors: Jeremy Rode, San Diego, CA (US); David Smith, Ellicott City, MD (US); Anis Husain, San Diego, CA (US); Mark Hsu, La Jolla, CA (US)

(73) Assignee: ZIVA CORP., San Diego, CA (US)

( * ) Notice: Subject to any disclaimer, the term of this patent is extended or adjusted under 35 U.S.C. 154(b) by 45 days.

(21) Appl. No.: 14/494,580

(22) Filed: Sep. 23, 2014

(65) Prior Publication Data
US 2015/0173034 A1 Jun. 18, 2015

Related U.S. Application Data

(60) Provisional application No. 61/881,393, filed on Sep. 23, 2013.

(51) Int. Cl.
H04W 56/00 (2009.01)
H04B 7/06 (2006.01)
(Continued)

(52) U.S. Cl.
CPC .......... *H04W 56/001* (2013.01); *H04B 7/024* (2013.01); *H04B 7/0617* (2013.01); *H04W 72/02* (2013.01); *H04W 84/18* (2013.01)

(58) Field of Classification Search
CPC .... H04W 56/001; H04B 7/0617; H04B 7/024
See application file for complete search history.

(56) References Cited

U.S. PATENT DOCUMENTS

2006/0092877 A1* 5/2006 Niemela ................... H04L 5/26 370/330
2013/0271072 A1* 10/2013 Lee ................... H01M 10/4207 320/108
2016/0081039 A1* 3/2016 Lindoff ............... H04W 52/383 455/450

FOREIGN PATENT DOCUMENTS

WO WO 2012/151316 A1 * 11/2012

OTHER PUBLICATIONS

Collaborative Beamfocusing Radios (COBRA): A reciprocity based distributed beamforming system, Rode, Gregorian, Ward, Husain, Jan. 24-27, 2016 (all pages).
(Continued)

Primary Examiner — Redentor Pasia
(74) Attorney, Agent, or Firm — Anatoly S. Weiser, Esq.; IPLCounsel.com

(57) ABSTRACT

Dynamic, untethered array nodes with internal clocks are frequency, phase, and time aligned/synchronized, and used to focus their transmissions of the same payload data coherently on a target or in the target's direction, using time reversal or directional beamforming. Information for alignment/synchronization may be sent from a master node of the array to the slave nodes, over RF node-to-node links operating on different carrier or subcarrier frequencies. Additionally, the up- and down-communications on the RF links may use different frequencies. The RF links may also be used to distribute the payload data across the array. Because of frequency division on the RF links, interference is reduced or avoided, and the process of alignment/synchronization may be performed concurrently for several or all the slave nodes. The array may also operate collaboratively to receive data from the target.

20 Claims, 6 Drawing Sheets

(51) Int. Cl.
*H04B 7/02* (2018.01)
*H04W 72/02* (2009.01)
*H04W 84/18* (2009.01)
*H04B 7/024* (2017.01)

(56) References Cited

OTHER PUBLICATIONS

Collaborative Beamfocusing Radio (COBRA), Rode, Hsu, Smith, Husain, May 28, 2013.
IEEE XPlore, Mar. 31, 2016, citation of Collaborative Beamfocusing Radios (COBRA): A reciprocity based distributed beamforming system, Rode et al., (acc. Nov. 17, 2016, all pages).
SPIE citation of Collaborative Beamfocusing Radio (COBRA), Rode, Hsu, Smith, Husain, May 28, 2013 (accessed Nov. 17, 2016, all pages).

* cited by examiner

SYNCHRONIZATION OF DISTRIBUTED NODES IN WIRELESS SYSTEMS

CROSS-REFERENCE TO RELATED APPLICATIONS

The present application claims priority from U.S. Provisional Patent Application Ser. No. 61/881,393, entitled APPARATUS, METHODS, AND ARTICLES OF MANUFACTURE FOR COLLABORATIVE ARRAY COMMUNICATIONS INCLUDING BEAMFOCUSING OF EMISSIONS, filed on 23 Sep. 2013; and from U.S. patent application Ser. No. 14/476,738, entitled SYNCHRONIZATION OF DISTRIBUTED NODES, filed on 4 Sep. 2014. Each of these patent applications is incorporated by reference herein, including claims, figures, tables, and all other matter.

FIELD OF THE INVENTION

This document relates generally to communications. In particular, this document relates to operation of collaborative untethered radio frequency (RF) communication nodes of an array.

BACKGROUND

The use of multiple transmit/receive antennas in wireless networks promises mitigation of interference and improved spectral efficiencies through focusing signals along a designated direction ("beamforming," "directional beamforming," or "directional focusing"), or on an intended receiver ("location-focusing" or "spot-focusing"). Compared to single-antenna-to-single-antenna transmissions, transmit beamforming may yield increased range (e.g., an N-fold increase for free-space propagation), increased rate (e.g., an $N^2$-fold increase in a power-limited regime), increased power efficiency (e.g., an N-fold decrease in the net transmitted power for a fixed received power), and/or may allow splitting a high data-rate stream into multiple lower data-rate streams. (Here, N is the number of cooperative nodes or antenna elements at the transmit side.)

Distributed or decentralized coherent RF transmit beamforming or spot-focusing is a form of cooperative communication in which two or more nodes (that is, nodes of an array of nodes) simultaneously transmit a common message, controlling the phase and timing of their transmissions so that the transmitted signals constructively combine at an intended destination or direction.

In the case of directional beamforming, the individual array nodes may be configured as a phased array to produce a beam that is approximately collimated in a given direction, but the beam is not specifically focused to maximize power at a given location of the target receiver. Phased arrays where the locations of the individual array elements and the target receiver are known, where the array elements are interconnected with cables or other calibrated interconnections (e.g., hardwired), and where a common centralized clock/time reference can be distributed among the array elements, can be configured to operate in such directional beamforming modes.

Decentralized or distributed arrays may be much more difficult to use as coherent beamforming phased arrays, either in transmit mode or receive mode. In a decentralized array, the individual nodes are untethered devices with independent clocks, i.e., without a distributed/hardwired clock or frequency reference. Additionally, in a decentralized array the precise positional coordinates of each node may be unknown and/or varying in time. Decentralized cooperative arrays and their operation for radio frequency (RF) communications are described in several commonly-owned and related patent documents, including the patent applications listed under the Cross-Reference to Related Applications heading and the following:

1. International Patent Publication WO/2012/151316 (PCT/US2012/36180), entitled DISTRIBUTED CO-OPERATING NODES USING TIME REVERSAL, filed 2 May 2012;

2. U.S. patent application Ser. No. 14/114,901, Publication Number 2014-0126567, entitled DISTRIBUTED CO-OPERATING NODES USING TIME REVERSAL, filed on 30 Oct. 2013;

3. U.S. Provisional Patent Application Ser. No. 61/481,720, entitled DISTRIBUTED CO-OPERATING NODES USING TIME REVERSAL FOR COMMUNICATIONS, SENSING & IMAGING, filed on 2 May 2011;

4. U.S. Provisional Patent Application Ser. No. 61/540,307, entitled DISTRIBUTED CO-OPERATING NODES USING TIME REVERSAL FOR COMMUNICATIONS, SENSING & IMAGING, filed on 28 Sep. 2011;

5. U.S. Provisional Patent Application Ser. No. 61/809,370, entitled APPARATUS, METHODS, AND ARTICLES OF MANUFACTURE FOR COLLABORATIVE BEAMFOCUSING OF RADIO FREQUENCY EMISSIONS OF RADIO FREQUENCY EMISSIONS, filed on 7 Apr. 2013;

6. U.S. Provisional Patent Application Ser. No. 61/829,208, entitled APPARATUS, METHODS, AND ARTICLES OF MANUFACTURE FOR COLLABORATIVE BEAMFOCUSING OF RADIO FREQUENCY EMISSIONS, filed on 30 May 2013;

7. International Patent Application PCT/US2014/033234, entitled DISTRIBUTED CO-OPERATING NODES USING TIME REVERSAL, filed 7 Apr. 2014; and 8. U.S. patent application Ser. No. 14/247,229, entitled DISTRIBUTED CO-OPERATING NODES USING TIME REVERSAL, filed on 7 Apr. 2014.

Each of the patent documents described above is hereby incorporated by reference, including specification, claims, figures, tables, and all other matter. We may refer to these documents collectively as "incorporated applications" or "related patent documents."

Several tasks may be necessary or desirable for a decentralized cooperative array of nodes to operate as a directional beamforming or spot-focusing array. First, a decentralized array may need to acquire channel information between the individual array nodes and the intended target/source of transmission, and provide a mechanism for the nodes to transmit/receive a correctly-weighted signal at each of the array nodes (or "elements," or "members," which terms are used interchangeably), so that directional beamforming or spot-focusing is achieved to within some predetermined or variable accuracy required by the system's specification or applications.

Second, the information to be transmitted by the decentralized array to a target may need to be distributed across the array (i.e., to the individual nodes). Alternatively and/or additionally, when the array is used for receiving transmissions, the data may need to be collected from the different nodes of the decentralized array.

Third, some control operations may need to be performed across the array.

Fourth, the individual nodes of the decentralized array should be phase-, frequency-, and time-aligned/synchronized, to enable the array to operate in a coherent manner.

Frequency alignment/synchronization means that that the nodes can operate on a common frequency. For example, the local oscillators (LOs) of the nodes may all be aligned so that the same frequency $\omega_1$ (which may be the frequency of the clock reference of the node or a frequency derived from the clock, such as by multiplication, division, phase lock, frequency synthesis) within some predetermined frequency tolerance is available at each of the nodes. The nodes may then transmit a signal at $\omega_1$ by upconverting a baseband signal using the $\omega_1$; and can process received signals at $\omega_0$ by downconverting them using the locally-generated $\omega_1$ or $\omega_0$ or yet another downconversion frequency. Time and phase alignment/synchronization means that the nodes agree regarding time/phase reference, within some predetermined time and phase tolerances. Achieving and maintaining alignment/synchronization and coordination of the array nodes is important to the correct operation of the array.

"Homodyne" arrays operate so that $\omega_1 = \omega_0$, requiring alignment/synchronization to the target. "Heterodyne" arrays operate so that $\omega_1 \neq \omega_0$. Heterodyne arrays need not synchronize to the target, but still need to perform "local" alignment/synchronization, that is, alignment of the nodes of the array to some common reference, typically a reference provided by one of the nodes. A heterodyne array may also operate with $\omega_1 = \omega_0$ as a special case, but it need not synchronize to $\omega_0$.

Some inter-nodal communications (communications between one array node to one or more other array nodes) are needed in such systems. The requirements applicable to the procedures used in the inter-nodal communications may be rather strict, especially those that are imposed by the need to achieve and maintain alignment/synchronization of the different nodes.

The process of alignment/synchronization may need to be repeated, because even when clocks have been aligned, every clock experiences limits as to how long that alignment persists due to random jumps in phase and frequency. This is known as the clock coherence limit. Exceeding the clock coherence limit may manifest as a random scrambling of the phases of the carrier waves used in the directional beamforming or spot-focusing, and a failure to achieve optimal or even minimally-acceptable performance. Even with atomic clocks and with fixed locations of the nodes, the coherence limit is eventually reached, requiring re-alignment of the clocks. In sum, a method used for alignment/synchronization should be fast enough to maintain the alignment required for acceptable communication operation of the array, given the coherence specifications of the clocks of the individual nodes. Moreover, there are other factors that may shorten the time between successive re-alignments, such as the movement of the nodes and the dynamic changes in the channel responses.

Improved techniques for communications between and among nodes are desirable, including improved techniques for time-phase-, and/or frequency-aligning/synchronizing the nodes and maintaining their alignment/synchronization in dynamic environments. Thus, needs exist in the art for improved node-to-node communication techniques for distributed coherent communications between an array of nodes and communication apparatus external to the array; for apparatus, methods, and articles of manufacture enabling such improved communications; and for phase/time/frequency alignment/synchronization techniques that can be used in ad hoc nodes of a distributed array for coherent communications.

SUMMARY

Embodiments, variants, and examples described in this document are directed to methods, apparatus, and articles of manufacture that may satisfy one or more of the above described and/or other needs.

An exemplary embodiment is a method of communicating between an array of ad hoc nodes and a target. The array includes a master node and a plurality of slave nodes. The method includes steps of: communicating between the master node and each slave node of the array to enable synchronization of said each slave node to the master node, the step of communicating with said each slave node being performed on a radio frequency (RF) side channel link associated with said each slave node, wherein a plurality of RF side channel links are established by the array, each RF side channel link operating on an upward frequency for transmissions to the master node and on a downward frequency for transmissions from the master node; performing frequency, time, and phase synchronization of said each slave node to the master node based on the step of communicating; distributing across the array common data for transmission to the target; and coherently transmitting from said each node of the array to the target signals at a common RF frequency, the signals at the common frequency carrying the common data, so that the signals carrying the common data add constructively in a general direction from the array to the target and/or in a general location of the target, the step of coherently transmitting comprising directional beamforming or location-focusing using time-reversal. The plurality of slave nodes includes a first slave node associated with a first RF side channel link, and a second slave node associated with a second RF side channel link. The first RF side channel link operates at a first upward frequency from the first slave node to the master node and on a first downward frequency from the master node to the first slave node. The second RF side channel link operates at a second upward frequency from the second slave node to the master node and on a second downward frequency from the master node to the second slave node. At least one frequency selected from the group consisting of the first upward frequency, the second upward frequency, the first downward frequency, and the second downward frequency is different from at least one other frequency selected from the group. These and other features and aspects of the present document will be better understood with reference to the following description, drawings, and appended claims.

DETAILED DESCRIPTION

Figure 1:
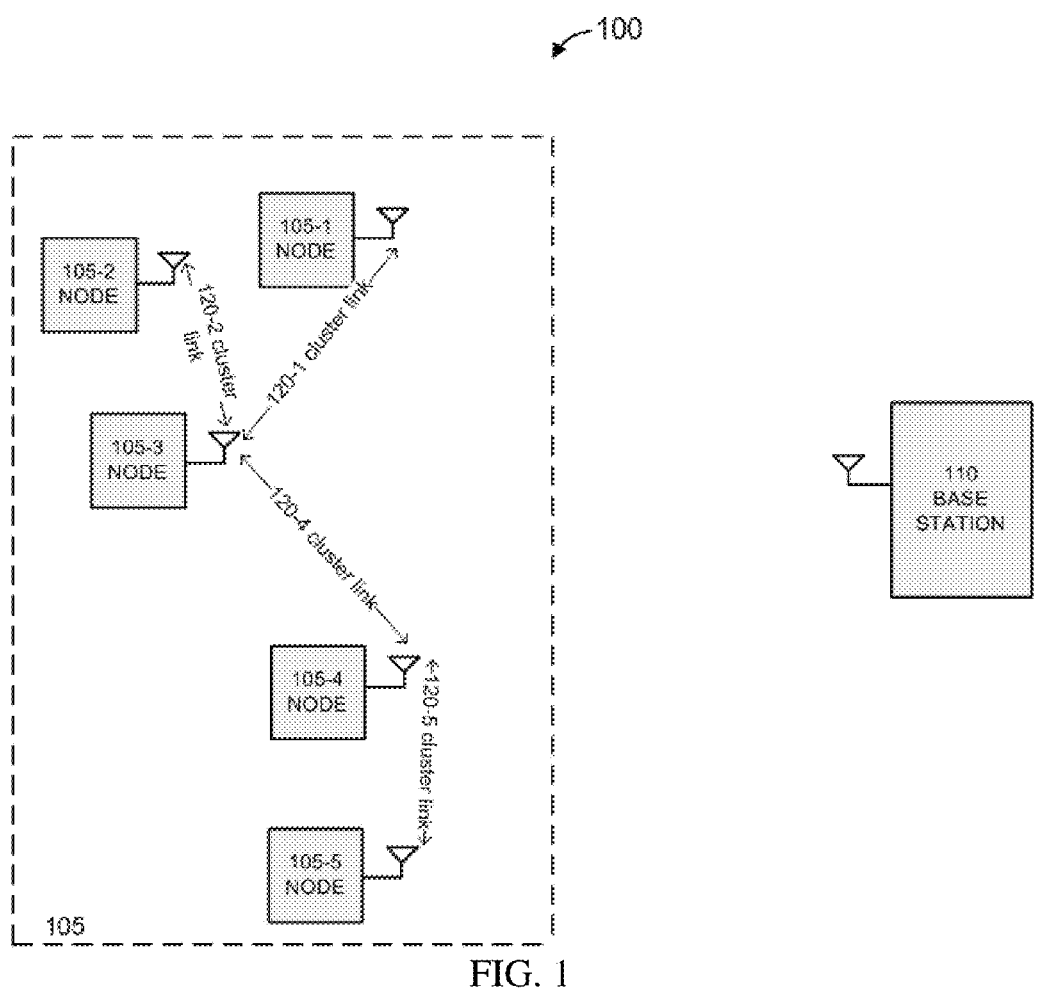
FIG. 1 illustrates selected components of a communication arrangement including a base station target/source and a collaborative array.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions and words with their inflectional morphemes do not necessarily import an immediate or direct connection, but include within their meaning connections through mediate elements.

The expression "processing logic" should be understood as selected steps and decision blocks and/or hardware/software/firmware for implementing the selected steps and decision blocks. "Decision block" means a step in which a decision is made based on some condition, and process flow may be altered based on whether the condition is met or not.

Array "nodes," "elements," and "members" are used interchangeably.

References to "receiver" ("Rx") and "transmitter" ("Tx") are made in the context of examples of data transmission from a transmitter to an intended or target receiver. For time-reversal communication techniques, the intended or target receiver may need to transmit to the transmitter a sounding signal, e.g., a pulse/burst or a pilot signal, and the transmitter may need to receive the sounding signal. Moreover, data communications can be bi-directional, with transceivers on both sides. In this document, the nodes of a cooperative array may be "transmitters" of data, which they transmit to an "intended receiver" (or "targeted receiver," "target receiver," "target Rx," or simply "target"), such as a base station. The roles may be reversed, with the cooperative array (or any of its nodes) also or instead being the intended or target receiver for the transmissions from one or more base stations. In the event that the ascribed meaning is different in a particular context, we will specify in the context what configuration is being discussed.

A "target" thus may be an entity that emits a sounding signal, and may generally include both transmit and receive functionality. Note that although we may occasionally refer to a target (or equivalent terms, as mentioned above) in the singular, the general description of the processes and systems involved applies to multiple targets; as is discussed in this document and the related patent documents, an array of nodes may transmit to multiple targets at different times, simultaneously, and/or using transmissions that partially overlap in time. Note also that a target may be a source of cooperative and/or opportunistic transmissions used for "sounding." The "sounding" term is explained below.

"Alignment" and "synchronization" refer to enabling a plurality of nodes to communicate coherently and collaboratively with a target. Once aligned, the nodes are enabled to transmit at the same frequency, with the same phase and at the same time. In this document, we generally speak of "alignment/synchronization," but references to either "alignment" or "synchronization" are intended to convey the same concept. When referring to specific types of alignment/synchronization, the type of alignment/synchronization may be explicitly indicated. Thus, "frequency alignment/synchronization" and similar expressions denote the ability to transmit at the same frequency; "time alignment/synchronization" and similar expressions denote having knowledge of a common time base so that the nodes can transmit and/or receive at the same time; and "phase alignment/synchronization" and similar expressions denote the ability to transmit at the same frequency with the same phase.

Selected examples of communication processes and architectures described in this document and in the related patent documents allow an array of untethered radio frequency (RF) transmit-receive (Tx/Rx) nodes with independent and unsynchronized clocks to achieve phase alignment/synchronization, frequency alignment/synchronization, and time alignment/synchronization, enabling the nodes to operate as a coherent array. For location-focusing applications, the nodes may be configured to capture "sounding" signals from one or more targets, and use time-reversal (TR) to retrodirect energy automatically back to the target(s). In this way, the array of nodes may be able to achieve spatiotemporal focusing of the energy on the one or more targets. In this document, we designate the nodes of such an array as "ad hoc nodes," to signify that the ad hoc nodes have their own physical clocks, and the nodes are "untethered" in the sense that they may be (1) free to move, in absolute terms (e.g., with respect to a point with fixed coordinates, and/or with respect to any or all of the targets), and to move with respect to each other; and (2) free to rotate around one or more axes. Some constraints on the movements of some or all of the nodes need not necessarily vitiate their untethered character; for example, nodes that are free to move in only one or two dimensions (and not all three dimensions) may still be ad hoc nodes, whether or not they rotate around any axis. Examples of such nodes may include radios carried by a squad of soldiers; radios onboard different aircrafts, water vessels or buoys, land vehicles, satellites; and similar nodes. The nodes may also be ad hoc even if they are not used in TR-communications; for example, nodes of a directional beamforming array may also be ad hoc nodes.

We have already mentioned the concept of "Local Oscillator" (a. k. a. "LO"). It may be used to generate the carrier frequency of any signals that are emitted by the node, and particularly signals transmitted to a target. For example, when the target emits a signal at a frequency $\omega_0$, the target may have an LO that generates the frequency $\omega_0$; the target may generate the LO or several LOs of different frequencies from a local reference, a "clock," for example, by multiplication, division, phase lock, frequency synthesis based on the clock signal. Similarly, if an array node operates (receives and/or transmits) at a frequency of $\omega_1$, a signal A $\cos(\omega_1 t + \phi_1)$ is an LO of the node, which may be generated from the clock of the node. In typical practice, these frequencies $\omega_0$ and $\omega_1$ are generated from a clock, which may be running at a much lower frequency or, less likely, a higher frequency than the LO; the clock may be a crystal oscillator, such as a quartz crystal oscillator. There are many techniques available to those skilled in the art to generate the LO frequency from the local clock. It may be assumed that whatever generation process is used, the random errors present in the LO (e.g., frequency drift, phase noise) are derived from the stability properties of the clock. In practice, however, signals generated from a reference oscillator may have significantly worse stability properties than the source clock from which they are generated. Hence, the disclosure of local alignment/synchronization in this document refers to the alignment/synchronization of the LOs used to generate the signals that are transmitted back and forth between the nodes (or the nodes and the target), and/or the alignment/synchronization of the clocks used to generate the LOs. Thus, in node embodiments the alignment/synchronization is performed on the clocks from which the LOs are generated; in other node embodiments, the alignment/synchronization is performed on the LOs; in still other node embodiments, the alignment/synchronization is performed on the combination of both. In array embodiments, the alignment/synchronization of the different nodes may be performed by two of more of the processes mentioned in the previous sentence.

The communication direction on a side channel link is "upward" when the transmission is from a slave node to the master node; and "downward" when the transmission is from the master node to a slave node.

Alignment/synchronization of an array is performed in "parallel" when multiple or all the slave nodes are aligned/synchronized simultaneously or in a substantially overlapping manner. If two nodes are aligned in parallel, the time consumed by such alignment is cut by between about 25 percent and 50 percent relative to the time required to align/synchronized the two nodes sequentially.

The term "different" in reference to frequency or frequencies, in the context of this document, does means not only that frequencies $f1 \ne f2$. It refers also to "bands" of frequencies created by transmitting signals on specific carrier frequencies. Specifically it means that the band of frequencies occupied by a signal of finite bandwidth $\Delta f1$ centered round $f1$ does not overlap with the band of frequencies $\Delta f2$ of another signal centered round the second frequency $f2$. In normal operation, when a signal is transmitted, it is sent by modulating a carrier frequency $f1$ such that the modulation spectrally broadens the signal causing it to occupy an additional bandwidth $\Delta f1$ centered round $f1$, creating a spectral band $f1+/-\Delta f1$, which defines that particular signal. In practice however, the actual frequency components generated by the signal may extend well beyond $f1+/-\Delta f1/2$. Hence it is common practice to specify a limit on the amount of power that the signal generates which lies outside the band $f1+/-\Delta f1/2$. For example it is common to specify that the fraction of the signal power lying outside this band must not exceed, for example, −15 dB of the total energy of the signal.

However, when a second signal is simultaneously transmitted using a carrier frequency $f2$, this second signal may occupy a band of frequencies $f2+/-\Delta f2/2$. For our purposes, when we refer to "different frequencies" $f1$ and $f2$, we mean that the spectral bands $f1+/-\Delta f1/2$ and $f2+/-\Delta f2/2$ do not share any common frequency components, i.e., they occupy different "spectral bands".

However, it was mentioned above that in real signals, some energy from the signal centered round $f1$ may exceed the spectral band assigned to that signal, hence some energy will exist at a frequency greater or less than $f1+/-\Delta f1/2$. It is clear that some of this energy may lie in the spectral band $f2+/-\Delta f2/2$ where it may cause corruption of the signal intended to lie in $f2+/-\Delta f2/2$. It is a common procedure to specify that as long as the total power from the signal using $f1$ adds less than a specified amount of energy into the spectral band centered round $f2$ (for example <20 dB), then the signals using frequencies $f1$ and $f2$ can be considered as "non-overlapping" and for our purposes we can refer to the signals as using "different frequencies."

This principle can then be applied in an obvious manner to the case of the simultaneous propagation of more than two signals.

"Sounding" and its inflectional morphemes refer to transmitting a signal from the target and capturing the signal by the nodes of the array for the purpose of obtaining information about the channels from the nodes to the target, for example, for forming TR signals. There are different modes of sounding. In accordance with the no-separation sounding approach, targets emit overlapped sounding signals, but the channel impulse responses (CIRs, or more generally, channel responses, CRs) might not be amenable to unique identification at the array nodes, and may be captured in a buffer at each node of the array. In accordance with a time-separated sounding approach, each target emits its sounding signal (e.g., a pulse or a pilot) at times sufficiently separated so that the nodes can deduce which target emitted the sounding signal from the timing of the received sounding signal. Each array node may acquire and store the channel response or the channel impulse response separately, with an identifier (ID) that identifies the target that emitted the sounding signal. This identification may be based on a separate protocol known to the array nodes. Examples of the protocols include a frequency ID list, and the protocol that establishes the sequence the targets use to send their sounding signals. This can be performed in both the heterodyne and homodyne modes. Other protocols may also be used. In accordance with a frequency-separated sounding approach, each target transmits overlapped or non-overlapped sounding signals, but the CRs can be uniquely identified by each node based on having different IF frequencies. In other words, the frequencies of the sounding transmissions differ from target to target, and the nodes can identify the different targets from the frequencies of the sounding transmissions. Additional sounding approaches include polarization-separation approach, signal labeling approach in accordance with which uniquely identifiable pulses from each of the targets are transmitted, and still other sounding approaches.

If the CRs (which term subsumes CIR) resulting from the different targets are separated at the nodes of the cooperative array by separate soundings (e.g., by different IF frequencies, or otherwise), the array can apply different data streams to the different CIR/CR sets corresponding to the different targets. For example, if a first target emits a signal and each node identifies and stores its copy of the CR resulting from this signal, then each node can convolve a first data stream with the node's copy of the time reversed CR of the first target. When the convolved signals of the array nodes are transmitted, after upconverting to the correct carrier frequency, the signals carrying the first data stream should be coherently focused (spatially and temporally) on the first target. Note that all the signals may be at different IF frequencies at the nodes, but arrive back at the target at the same frequency; that same frequency may be the frequency of the sounding transmission from the first target, or it may be another frequency. (Preferably, the array transmits on the same frequency as the sounding frequency, or a frequency sufficiently close to the sounding frequency so that the channel response does not differ appreciably between the two frequencies.) At other locations, including the locations of the other targets, the transmissions from the nodes of the cooperative array will generally not combine constructively, and an observer at the other locations should see only incoherent signals without coherent data that can be detected and decoded. In general, the signals will combine constructively only at the location of the target that emitted the sounding pulse and whose time-reversed CRs were utilized by the array for the retrodirected transmission of the data stream.

If the CRs/CIRs from the different targets are not separable (or not separated) and consequently are combined as a composite sounding signal in a buffer at each node of the cooperative array, then a single data stream may be broadcast to all the targets, but generally cannot be sent only to specific targets. To do so, each of the nodes may be configured to convolve the data stream with the node's composite (and time-reversed) CR which is the combination of the sounding signals from all the different targets that emitted the sounding signals. The TR transmissions from the multiple nodes of the array will then focus the same data stream at the multiple targets whose time-reversed CRs/CIRs were included in the composite sounding signals in the nodes' buffers. If a target did not emit a sounding signal, no coherent data stream will generally appear at that target.

The sounding signals from the different targets may not be easily "separable" at the nodes of the cooperative array. An example of such circumstances is when the sounding signals are overlapping in time, use the same frequency, and do not carry information from which the targets can be distinguished. However, there are cases where it may be possible to apply advanced processing techniques to determine which part of the complex CR/CIR corresponds to specific targets. Although the resultant multipath signal may appear chaotic and complex at the nodes of the array, the spatial distribution of the antennas may create a deterministic signature which can be used to identify the component of the signal arriving from each target. At each node, this may enable the composite signal to be deconstructed using an eigenvalue decomposition method that is capable of separating out the different signal components. For example, Singular Value Decomposition or SVD may be used for separation of the different components. Singular Value Decomposition and identification of specific sources of emission (e.g., the targets) from a combined signal are described in the related patent documents and in a commonly-owned U.S. patent application Ser. No. 13/462,514, entitled ANTI-GEOLOCATION, 2 May 2012, which is also incorporated herein by reference in its entirety, including specification, claims, figures, tables, and all other matter.

Briefly, the application of eigenvalue decomposition to a composite signal can decompose the signal into its individual components, which, when time-reversed, focus on the multiple sources (e.g., A, B, C and D) independently. It is then possible selectively to choose to omit or modify the properties (e.g., gain) of each eigenstate independently. If the TR version of eigenstate corresponding to the source B (by way of example) is not launched from each node (or a subset of nodes) of the array, then no signal is focused at the source B even though B emitted a sounding signal. In this example, a gain of zero is effectively applied to the eigenstate B, and unity gain to each of the other eigentstates. The node may be configured so that it has the ability to apply independently to each eigenstate any arbitrary gain from zero to essentially infinity, or gain modulated by a data sequence. Other nodes of the array may be similarly configured and perform analogous processes. The individual gain functions can be different, but the data sequences applied at each node may be the same.

As should be apparent to a person skilled in the art after perusal of this document and the related patent documents, the TR communication techniques operate to scramble the signal at unauthorized receivers (snoopers), whether the location of the intended target is known or not known. A snooper may be able to remove the scrambling if the snooper uses a directional antenna to observe a single node of the cooperative array. The snooper's gain, however, may then be much lower than the gain on the authorized channel (that is, the channel to the intended target or one of the intended targets). It can be estimated that, in many situations, the difference in gain may often be 20-30 dB. In examples, the cooperative array is configured to operate a channel to an intended target at the SNR threshold for error-free performance, or slightly (e.g., 1-3 dB) above the threshold. In the above example this may result in the snooper receiving a signal 20-30 dB below the SNR threshold for error-free performance, thereby reducing the snooper's opportunity to eavesdrop, because the snooper does not benefit from the coherent gain that the array provides to the intended target(s).

A more complex coding system may be implemented to add protection to the data transmitted by the cooperative array so the data stream cannot be acquired by a snooper observing a single array node. For example, a data stream to be transmitted from the array may first be split into I (two or more) separate and uniquely different streams using a code that has the property that when the original data stream is broken into I different substreams, and when the I substreams sum together with equal amplitude, the sum re-creates the original data stream. A TR-enabled array may emit different substreams from each array member (or from a different subset of array members). However, since TR can enable I substreams to overlap and add spatially at the target, TR with the additional requirement of amplitude balancing of the emitted signals may recreate the original data stream at the target.

The amplitudes of the different substreams arriving at the target may be balanced, but at the same time they may appear unbalanced when they are emitted or when observed at any other location. Assuming $(\alpha_{m0}, \alpha_{m1}, \ldots, \alpha_{mn})$ are the amplitudes of impulses received at nodes 0-n of the array and which originated as a sounding pulse from the target m, then emitting the time reversed version of the sequence $$K\left(\frac{\gamma_{m0}}{\alpha_{m0}}, \frac{\gamma_{m1}}{\alpha_{m1}}, \ldots, \frac{\gamma_{mn}}{\alpha_{mn}}\right)$$

ensures that all the signals arriving at the intended target are of (substantially) equal amplitude and should spatially sum to provide a coherent signal. Here, K is an amplitude adjustment constant applied equally across all array nodes. This allows the system to ensure that signal levels lie within the range appropriate for the RF electronics at the nodes. The terms $\gamma_{mn}$ allow individual nodes to apply local adjustments for signal optimization purposes. The benefit of this technique is that the spatial code ensures that no single substream contains all the information in the original data stream, and generally the only location where amplitude balance and constructive time alignment are possible is the intended target that emitted the sounding signal.

Note that TR may provide multipath gain in addition to the array gain.

Time-reversal techniques may be applied not only to data communications, but also to power focusing (electro-magnetic pulse or EMP), and any other applications requiring selectivity.

One of the nodes in the array may be defined as a "master" node, a reference for alignment/synchronization of the other nodes of the array; the other nodes may be referred to as "slave" nodes. Embodiments of the cooperative array implement a procedure where the slave nodes are phase-, frequency-, and time-aligned/synchronized to the master node. When this is done, the array may be set up to ensure that, if the cooperative array protocol is used, the array will automatically location-focus the signals on an external target, with fading eliminated or reduced and without requiring knowledge of the target's position. The node designated as the mater node may change during operation, for example, in response to the varying dynamic conditions of the environment and/or of the array. The master node may also be responsible for other functions, such as control and coordination of the array, distribution of data for transmission to the target, collection of data received from the target, and still other functions.

In TR-based location-focusing embodiments, the cooperative array may emit signals at the same start and finish times across the array, based on a common time reference. The accuracy of the time synchronization across the cooperative array need not be perfect, but may be accurate to a reasonable fraction (e.g., 1/10) of the sounding pulse envelope—not of the carrier frequency period. This feature may permit, for example, nano-second alignment accuracy, instead of femto-second alignment accuracy. The array nodes do not necessarily require to measure the exact arrival times of the sounding signals that they capture at each of their receivers, and each node does not necessarily require knowledge of the arrival times of the sounding pulses at any other node of the array. But the nodes do need to capture the sounding pulse and may need to agree on the "capture window," that is, the shared time period within which the nodes of the array attempt to capture the sounding pulse. The master node (or another assigned node) may be given the responsibility for determining the start and the duration of the capture window (or, alternatively, the start and finish times), the communication of this information to the other nodes, to ensure that the array nodes are "listening" when the sounding pulse is emitted, and that the capture window (which is essentially defined as the time period over which the nodes are capturing any arriving signals generated by the sounding pulse) is long enough so that every node of the cooperative array will capture the sounding signal, including its significant multipath components, if present. In embodiments, the master node can ensure that the capture window is long enough by assuming the window is longer than the worst case of the sum of the two longest propagation delays between the master node and the slave nodes. This may be particularly useful for cases where the target is Line-of-Sight (LOS) or weakly Non-LOS (NLOS) to the cooperative array.

For situations in which there is severe multipath that extends over time periods that greatly exceed (e.g., by a factor of 2 or more) the inter-nodal propagation time, the master node may be configured to extend the capture window by the excess time, or longer. There are many techniques by which the master node can acquire the knowledge regarding the length of multipath and node-to-node delays. For example, the master node can be configured to set an initial capture window of a very long duration, and share this information with the other nodes of the cooperative array. After the nodes of the array capture the sounding signal, each slave node calculates the extent of the sounding pulse plus any multipath decay spreads and communicates this information to the master node. The master node then determines the actual capture window required, possibly including an additional time margin, and communicates the new capture window parameters (start/stop times, or one of the start/stop times and duration, for example) to the slave nodes. The nodes of the array then proceed to acquire a new sounding pulse using the new capture window. In an alternative approach, the nodes actually capture the sounding signal over a long time period and the master node simply decides how to reduce this period into a shorter capture window by using only the segment between different time stamps applied to the whole signal, without using a new sounding for this purpose.

One of the more challenging cases is presented when a large array with a wide spatial distribution of nodes is used to focus a signal on a target whose presence is known (from the signals emitted by the target, for example), but whose location is not known to the array. A directional beamforming array may attempt to send a beam in the general direction of the target with the beam's power maximally concentrated in that general direction (as the direction is estimated). A TR node array, however, may be configured to focus its collaborative transmission on the desired target, without actual knowledge of the location of the target so that maximum power is not only in the direction of the target but at the location of the target. Thus, when the full angle Field of View (FOV) of the cooperative array (as observed from the target) becomes large, and in particular when the array is randomly distributed through space, it may be difficult for a conventional system to produce even directional beamforming in a meaningful manner. Time-reversal communications, however, may work well for the high FOV distributed arrays. Furthermore, a cooperative TR array with its nodes distributed in three dimensions may be able automatically to focus its transmissions in three dimensions, including the elevation dimension.

The captured signals used in the sounding process may be "cooperative signals" or "collaborative signals," that is, signals sent by the target for the purpose (or one of the purposes) of allowing the nodes of the array to obtain estimates of the channels between the target and the nodes; the captured signals may also be "opportunistic," sent from the target for some other purpose.

FIG. 1 illustrates in a high level, block-diagram manner, selected components of a communication arrangement 100. This arrangement includes an array of ad hoc nodes 105 that communicate with each other. As shown, the array 105 includes five distributed cooperating nodes, 105-1 through 105-5. In similar arrangements, the array 105 may include any number of a plurality of nodes 105, for example, 2, 3, 4, 5, 6, 7, 8, 9, 10, or more. The arrangement 100 also includes a base station 110, a target.

The nodes 105 may be within Line-of-Sight or Non-Line-of-Sight of each other, and may communicate directly with each other via side channel links 120. As shown, the links 120-1, 120-2, and 120-4 connect the node 105-3 to each of the nodes 105-1, 105-2, and 105-4, respectively; and the link 120-5 connects the node 105-4 to the node 105-5. The node 105-3 may thus communicate directly with each of the nodes 105-1, 105-2, and 105-4. The node 105-3 may communicate with the node 105-5 indirectly, through the node 105-4 and the links 120-4 and 120-5. This is just one example. More generally, any of the nodes 105 may be connected by such side channel link 120 to any of the other nodes 105, and any of the nodes may lack a direct link to any other node (or nodes), and communicate with such other nodes through intermediate nodes and multiple (two or more) links. The side channel links 120 may be implemented, for example, using short-range RF link such as a Bluetooth® link, WiFi, or other short-, medium-, and longer-range RF technologies. As discussed in some the related patent documents, the side channel links 120 may also be implemented using non-RF technologies and transmission media, including optical technologies, such as free-space or guided optics, and sound/acoustic (ultrasound) technologies.

Figure 2:
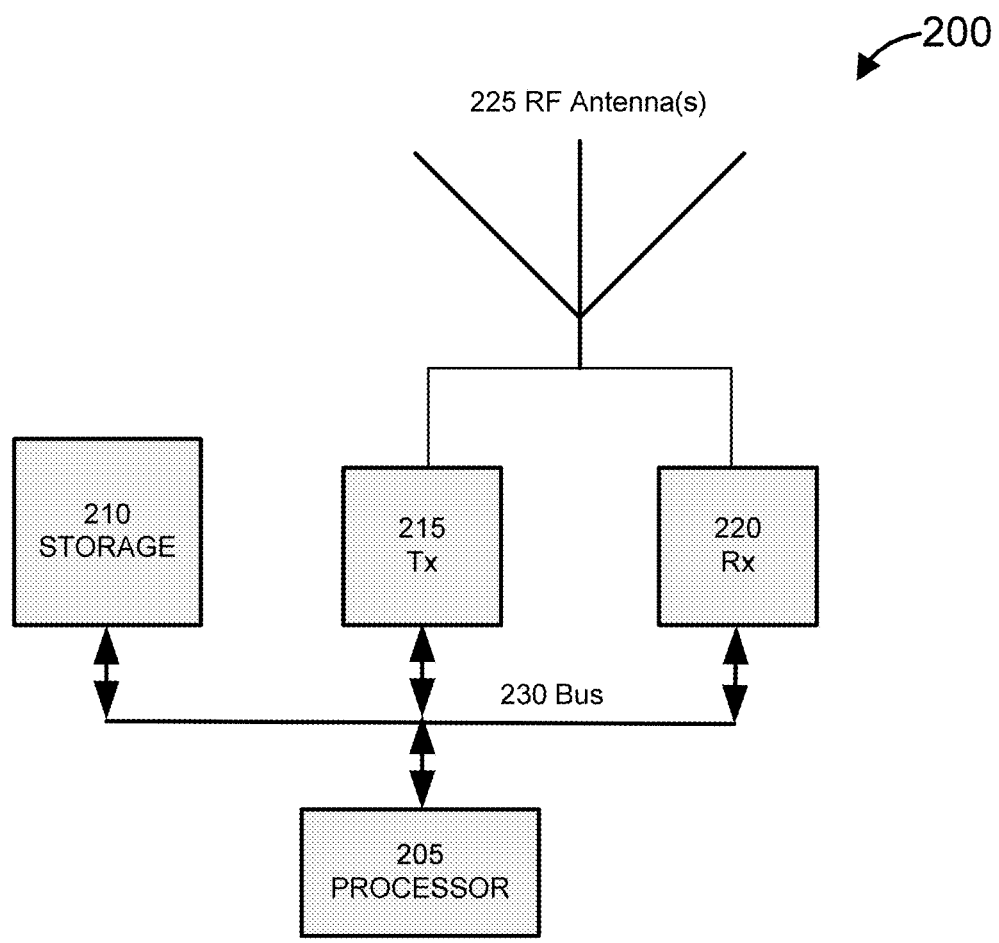
FIG. 2 illustrates selected blocks of a communication apparatus configured in accordance with one or more features described in this document.

FIG. 2 illustrates selected elements of an apparatus 200 configured in accordance with one or more features described in this document. The apparatus may be any of the cooperative nodes 105 and/or the base station 110. The apparatus may include a processor 205; a storage device 210 for digitally capturing the incoming sounding signal at each node (and which may store program code for execution by the processor 205 and other applications that use digital storage); an RF receiver 220 configured to receive radio frequency signals, such as sounding signals and transmissions on the RF side channel links; an RF transmitter 215 configured to transmit radio frequency signals, such as collaborative communications to a base station and transmissions to one or more other nodes on the RF side channel links; and one or more RF transmit and receive antennas 225 coupled to the receiver 220 and the transmitter 215. A bus 230 couples the processor 205 to the storage device 210, the receiver 220, and the transmitter 215; and allows the processor 205 to read from and write to these devices, and otherwise to control operation of these devices. In embodiments, additional receivers, transmitters, and/or other devices are present and coupled to the processor 205.

The nodes 105 may be configured to communicate coherently (in a synchronized and coherent manner) with the base station 110. The communication is "coherent" in the sense that the nodes 105 can transmit the same data to the base station 110 in a synchronized manner so that the radio frequency transmissions from all or a plurality of the nodes 105 add coherently in time and space at the receiving antenna(s) of the base station 110; such coherent communications include directional beamforming and location-focusing.

Figure 3:
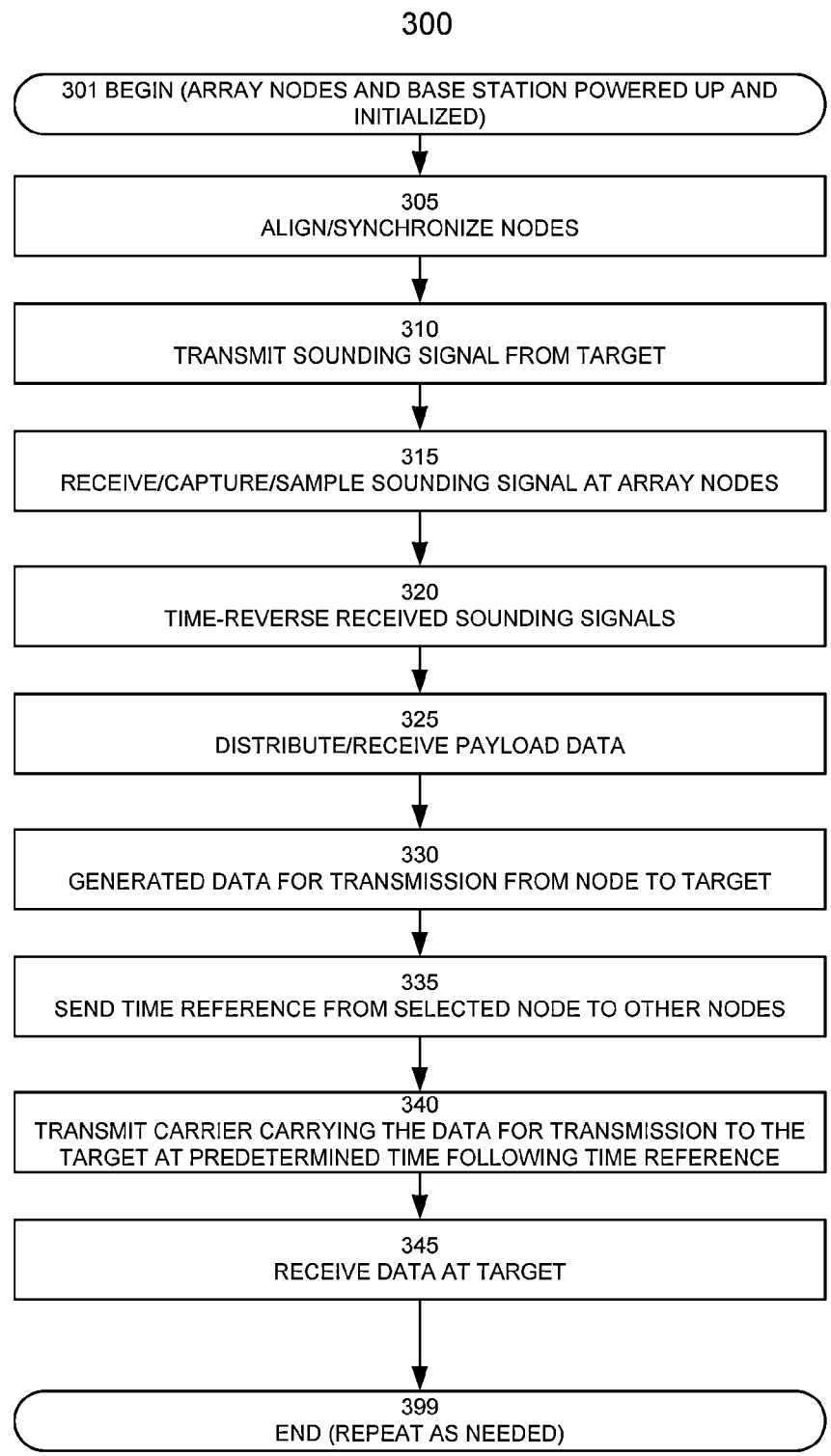
FIG. 3 illustrates selected steps of a process of time-reversal communications between an array of collaborative nodes and a base station.

FIG. 3 illustrates selected steps of a process 300 for an array of collaborative nodes, such as the nodes of the array 105, to transmit data to a target, such as the base station 110, using time reversal.

At flow point 301, the nodes of the array 105 and the base station 110 are powered up, initialized, and ready to communicate.

In step 305, the nodes 105 are aligned/synchronized. A single node 105 (for example, a selected master node) may be used to set a common time/phase/frequency reference for all the nodes of the array. Alignment/synchronization of nodes may be performed as is described in the related patent documents, particularly in (1) International Patent Publication WO/2012/151316 (PCT/US2012/36180), entitled DISTRIBUTED CO-OPERATING NODES USING TIME REVERSAL, filed 2 May 2012; (2) U.S. patent application Ser. No. 14/114,901, Publication Number 2014-0126567, entitled DISTRIBUTED CO-OPERATING NODES USING TIME REVERSAL, filed on 30 Oct. 2013; and (3) U.S. patent application Ser. No. 14/247,229, entitled DISTRIBUTED CO-OPERATING NODES USING TIME REVERSAL, filed on 7 Apr. 2014. Alternatively, the alignment/synchronization may be performed otherwise. In the end, all the nodes 105 are aligned/synchronized, and can emit simultaneous signals for coherent communications such as directional beamforming and location-focusing.

In step 310, the base station 110 transmits to the nodes 105 a sounding signal. The sounding signal may be a cooperative signal or an opportunistic signal. The sounding signal may be a sharp pulse approaching an impulse, a Gaussian pulse, chirp, barker code, Gold code, or another appropriate burst with substantially-flat frequency response in the communication band of interest. The sounding signal may be selected to have a good autocorrelation function (i.e., approaching that of an impulse function), as is known in communication theory and related fields (e.g., CDMA, autocorrelation radar).

In step 315, each of the nodes 105 receives, captures, samples, and stores the received sounding signal. Each of the nodes 105-N may thus store the channel response $CR_N$ between itself and the base station 110 (or analogous or equivalent information). The same master node as was used for synchronization in the step 305 may instruct each of the nodes 105 to use the same or substantially same temporal window to receive/capture/sample the sounding signal from the base station 110. The windows across the array 105 may be identical in lengths and may have the same center times. Each node 105 may be instructed by the master node when to start looking for the sounding pulse, and when to stop. This timeframe may be referred to as the "capture window," that is, the time period during which all the nodes are attempting to receive the sounding signal. There are other ways to receive the sounding signal at the nodes 105. For example, the capture windows do not necessarily need to be at the same times or be of the same lengths, but should have a common symmetry point on which to mirror their transmissions.

In step 320, each of the nodes 105 performs time reversal on the stored signal contained within the capture window (in variants, on the entire stored signal contained in the capture window), obtaining and storing its time-reversed channel response $TR\text{-}CR_N$. In practice, this step is an approximation of time-reversal, because causality limits the length of each recorded $CR_N$. The $TR\text{-}CR_N$ of a particular node 105 is a time-reversed version of the capture window of the particular node 105. The time-reversal may be performed at carrier frequency, an intermediate frequency, or baseband.

In step 325, each of the nodes 105 obtains payload data that the array 105 intends to transmit to the base station 110. The payload data may be distributed, for example, from one or several of the nodes 105 to the remaining nodes, using the side channel links 120. The payload data may be distributed from the master node. The payload data may originate at the master node, another node 105, two or more of the nodes 105, or all of the nodes 105. In many embodiments, the payload data is distributed at earlier time, for example, before the sounding pulse is captured.

In step 330, each of the nodes 105 may generate its data for collaborative transmission to the target. For example, each node may convolve its respective time-reversed channel response $TR\text{-}CR_N$ with the common payload data, to obtain its respective data for transmission, $DT_N$.

In step 335, a selected node 105 may send a reference transmission, such as a short pulse, to the remaining nodes 105; the remaining nodes 105 may receive the reference transmission sent by the selected node 105. The selected node 105 may be the master node or another node. Several or each of the nodes 105 may be capable of being the master node, and the selection or rotation of the master node role among the nodes 105 capable of being the master node may be predetermined or performed in the field using various predetermined conventions.

In step 340, each of the nodes 105 transmits its carrier with the respective convolved data $DT_N$. The phases of the carriers are equalized in step 305 and the phase offset correction resulting from the nodes being at different distances from the target is set in steps 320 and 325. This step is performed by the nodes 105 simultaneously, for example, following a predetermined time duration S after the emission of the reference transmission. The length of the predetermined time duration S is preferably longer than the Signal Flight Time (SFT) between the selected node 105 (e.g., the master node) and each of the remaining nodes 105. In this way, all of the nodes 105 transmit their respective data $DT_N$ coherently, at the same time. All of the nodes 105 can measure the length of the time period S based on the same time reference; for example, each of the nodes 105 measures S based on the time reference established in step 305 using the clock of the selected node 105. The nodes 105 have the information needed to correct their internal time/clock references and/or LOs, because of the alignment/synchronization in the step 305. The time-reversal process equalizes both the delays of the multipath signatures and the propagation delay differences, so that all the signals from the nodes arrive at the base station 110 at substantially the same times, creating array gain and multipath gain and eliminating phase fading (Rayleigh Fading) since all the carriers arrive at the base station 100 with equal phase. No intentional gain is obtained at an unintended (hostile) transceiver, because no matched filtering or alignment generally occurs at any other location but the intended receiver (the base station 110, the target).

In step 345, the base station 110 (the intended receiver/target) receives the transmissions from the nodes 105. Because of the properties of time-reversal communications, the received transmissions add constructively in time-space at the base station 110. The properties of time reversal communications cause such coherent focusing, without the need to synchronize the nodes 105 to the base station 110. The time reversal process removes many of the sources of timing errors.

In effect, the ad hoc distributed nodes 105 act similarly to a single transmitter with multiple spatially-diverse antenna elements. Among potential benefits of this technique is the ability to communicate collectively with the base station 110 in situations where a single node 105 may not be powerful enough to close the connection to the base station 110 on its own, for example, due to insufficient signal strength, high noise or interference levels, and/or other reasons for poor link reliability.

The process 300 may then terminate at flow point 399, and be repeated as needed.

Control and configuration of the array for cooperative tasks (such as transmission of data to the target(s)) may rely on communications between and among the array nodes. For example, the array nodes may need to agree on which target to send data to, what power levels should be used in transmitting to the target, and exchange other information needed for various communication layers. The inter-nodal communications are also needed to align/synchronize the nodes to make coherent transmissions possible, including clock alignment/synchronization, phase alignment/synchronization, and/or frequency alignment/synchronization. Other tasks for which inter-nodal communication may be needed include distribution across the array of the data for transmission to the target(s), and collection of data received by the array cooperatively from the target(s). The inter-nodal may are performed over the side channel links 120, which may be RF links. In embodiments, the links 120 operate on RF frequencies that are different from the frequency (frequencies) of the "main" RF channel, that is, the channel between the array and the target.

Frequency alignment/synchronization of one node to another node, for example, a slave node to a master node, may be performed as follows. The slave is configured to send a signal of a predetermined duration to the master node. The master node is configured to count the number of RF oscillations of a known, predetermined frequency emitted by the slave node, within the predetermined time duration. Note that the oscillations may be that of a carrier frequency or of a signal carried by (modulating) the carrier frequency. If the RF is 1 GHz and the period is 1 second, for instance, one billion oscillations would be expected. If the master node counted 1,000,002,000 oscillations, it could be concluded that the frequency difference is two parts per million, with the master node having the slower of the two clocks. The master node then generates a signal that it returns to the slave that contains the information that allows the slave to determine its frequency offset of the slave node's reference relative to the master node's reference. Additionally, the master may measure the phase of the received RF oscillations relative to the master's clock and transmit the phase information to the slave node. The slave node may then use this information to adjust its clock and/or LO to synchronize to the master node. Further, since the slave node emitted the original signal and receives the return signal from the master, the slave node may also estimate the round-trip delay between the two nodes, allowing it to account for the effect of propagation phase differences that are the result of the signals travelling over a finite distance between the nodes.

Another way to align/synchronize the slave nodes to the master node is for the master node to emit pulses separated by a predetermined time period. A slave node may then count the pulses of its clock (or a signal derived from its clock) and determine the frequency offset of its internal reference from that of the master node internal reference.

Another method of frequency alignment may involve a clock signal being sent from the master node to the slave node and the slave node creating a term related to the difference frequency between the master node and the slave node. The slave node then adjusts its clock frequency till this difference term reduces to zero. This method allows all the slave nodes to synchronize with reference to the master node and by implication to each other.

After the clock frequencies have been aligned/synchronized and the round trip delay estimated, time synchronization may be established by a number of different procedures. For example, the master node may be configured to emit a pulse at a predetermined time, which time is recorded by the master node and may be added to the signal as a subsequent data stream telling the slave nodes at what time the master node emitted the pulse. Each slave node may then compare this predetermined time with the time it actually measured the arriving pulse. Each slave node knows the round trip time due to the propagation distance between master node and the slave node and when it subtracts half of this value (one way delay) any remaining difference is the time offset error between the master node and the slave node, which can then be corrected.

Once the array is aligned/synchronized to the common time, the master node can define a t=0 time stamp, thereby aligning the time reference across the array. Alternatively, if the master node has been aligned to an external time reference, e.g., using GPS, it may distribute this external time value enabling calibrated time to be distributed across the array. This is particularly valuable if many of the nodes have limited visibility of time reference signals such as GPS.

In embodiments where the side channel links are RF links, the sounding signals from the target and the TR signals on the main channel between the array and the target may interfere with and corrupt the inter-nodal communications and particularly the local alignment/synchronization signals. Additionally, if the slave nodes attempt to establish local alignment/synchronization at the same time or at overlapping times, interference between and among the side channel signals may also occur and may degrade or prevent the inter-nodal communications and the alignment/synchronization processes.

Thus, in embodiments, the inter-nodal communications between the slave nodes of the array and the master node of the array are performed using a carrier frequency that is substantially different from the carrier frequency of the main channel. As a specific example, the local alignment/synchronization may be performed using a signal in the 2.4 GHz band, and the main channel alignment/synchronization may be performed in the band around 700 MHz. Other combinations are also feasible. This may prevent interference between (1) the sounding and external TR focusing, and (2) the local alignment/synchronization process. But the problem of preventing or reducing the interference between and among the nodes of the array during the local alignment/synchronization process still remains if they all use the same carrier frequency.

Another issue with sending the actual LO signals back and forth is that these may be relatively high frequency signals. It may make sense to use inter-nodal signals that are much lower in frequency, and use these lower-frequency signals to modulate higher frequency carrier signals for transmission between the nodes. The frequency and phase properties of the higher carrier frequency signal carrying the inter-nodal communications may be unimportant to the alignment/synchronization process and so they can be removed from the alignment/synchronization process; this should be the case if the carrier frequency is much higher (e.g., by a factor of ten or more) than the frequency of the inter-nodal signals used for the local alignment/synchronization.

One way to perform the local alignment/synchronization across the array is sequentially, using what we refer to as Time Division Duplexing or TDD. One slave node sends a signal to the master node on a frequency $\omega_{11}$, with all the other slave nodes remaining silent. As mentioned above, $\omega_{11}$ may be selected to be different from the main channel frequency $\omega_0$ in order to avoid interference, to enable continuous or continual array synchronization process without interrupting the array-target communications. The master node may then reply back on the same nominal frequency and the local alignment of the first slave node to the master would be performed. This back-and-forth process may be repeated multiple times. Once the first slave node has completed its alignment/synchronization process, a second slave node would perform the same process on the same nominal frequency, and so on until the entire array has performed the local alignment/synchronization. Because the side channel links operate on the same frequencies, a round-robin process may be preferred to avoid interference from one side channel link to another. Only one slave node is thus aligned/synchronized at a time each takes it turn to perform alignment. Similarly, the transmissions from a slave node to the master node may use the same frequency band as the return transmission from the master node to the slave node. Hence, to avoid interference of the signals, these operations may need to be performed sequentially. This kind of round-robin sequential operation reduces the resources required by the master node. The downside, however, is that the local alignment/synchronization across the array is prolonged.

The time needed to align/synchronize a single slave node is determined by the slave node to master node propagation time and processing time. Even if the distances between nodes extend to several kilometers, the round trip propagation times may still be in the microseconds. Processing delays, including delays due to implementing protocols and repetition of the processes to improve Signal-to-Noise ratio, may result in total per-node delays that can extend into the tens of milliseconds, and longer. In the case of arrays with a large number of nodes, arrays where the nodes are mobile and moving with significant velocity, and/or environments where there is serious distortion of the signals between the nodes (such as strong multipath or external interference), the entire local alignment/synchronization process could take so long that the array may require new alignment/synchronization even before the previous local alignment/synchronization process has completed. This is a problem.

One particular concern relates to the coherence of the clocks that are used to generate the signals. Each of the clocks has a finite Allen variance, which is a metric that determines how long the clock remains accurate without random jitter and phase jumps occurring. This is a problem for arrays of nodes with independent clocks, such as ad hoc nodes, and particularly for arrays of ad hoc nodes that use relatively inexpensive quartz crystal clocks. Allen variance of a quartz clocks is not likely to guarantee stability required for directional beamforming or location-focusing for much longer than a few seconds. Further, a signal derived through frequency multiplication may have an Allen variance significantly worse than the original crystal clock. Still further, in an array of N nodes with different clocks, the net Allen variance becomes a statistical sum of the variances of all the clocks, i.e., $$\sum_{i=1}^{N} \sigma_i^2,$$

where $\sigma_i^2$ is the Allen variance of a single clock.

The implementation of large arrays for collaborative and coherent communications (e.g., directional beamforming, location-focusing) may thus be fundamentally limited by the available coherence time of the nodal clocks when the arrays perform clock synchronization using a round robin sequential alignment/synchronization method, because the process may require times close to or in excess of the net coherence time of the clocks. It is important to achieve array alignment/synchronization within time frames shorter (and, preferably, substantially shorter) than the net clock coherence time, to allow the array to be used for longer periods before realignment is required.

Figure 4:
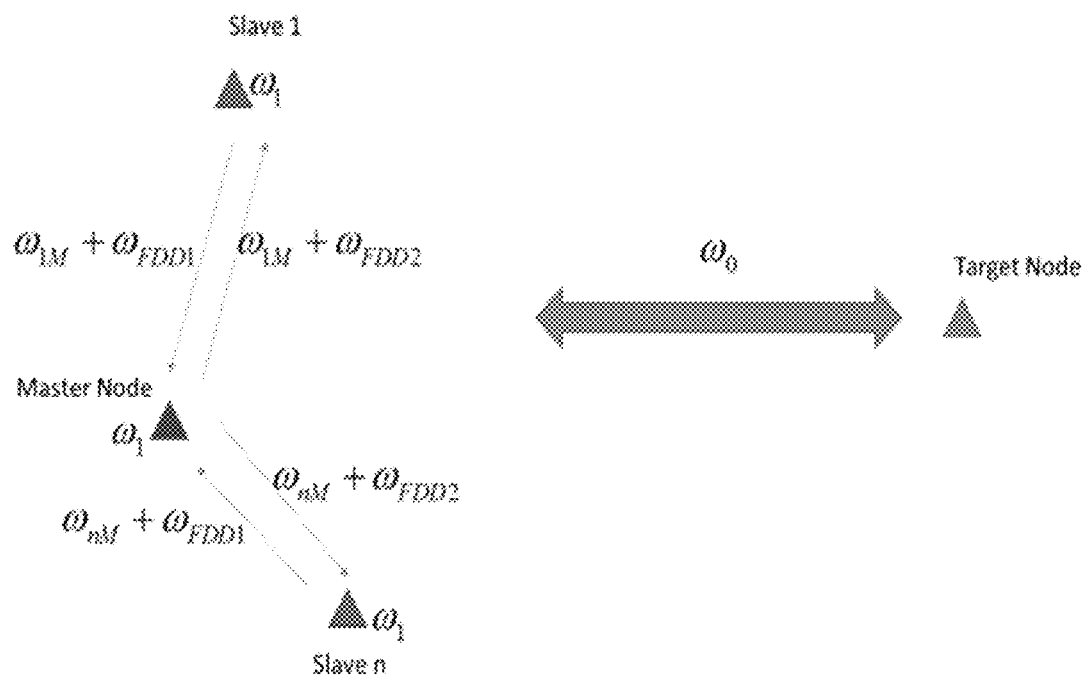
FIG. 4 illustrates selected aspects of communications between nodes of an array using different carrier frequencies.

In embodiments, local alignment/synchronization of the array is implemented by enabling the local alignment/synchronization of slave nodes to be performed in parallel, that is, simultaneously or in a substantially overlapping manner. In variants, the upward slave node to master node signal transmission is carried out at the same time as the downward master node to slave node signal transmission. One way to do this is to configure the array so that each slave node to master node side channel link is operated at a different carrier frequency, with no frequency overlap between the different side channel links (and no frequency overlap between the slave-master side channel links and the main array-target channel). As defined earlier, "different frequency" and "no frequency overlap" are to be understood in the sense that if signals from a source intended to propagate at carrier frequency f1 contain frequency components at frequency f2 then these components must be significantly lower power (typically <20 dB) than the signals which are intended to propagate at frequency f2. An additional requirement may be imposed: that the frequency of the upward slave-master channel be different from the frequency of the downward master-slave channel. FIG. 4 illustrates this arrangement. As illustrated in this figure, while all the array nodes have a substantially the same LO frequency $\omega_1$, Slave Node 1 communicates with the Master Node on frequency $\omega_{1M}+\omega_{FDD1}$, and the Master Node returns the signal on $\omega_{1M}+\omega_{FDD2}$, where $\omega_{FDD1}\neq\omega_{FDD2}$. Slave Node n performs the same functions on $\omega_{nM}+\omega_{FDD1}$ and $\omega_{nM}+\omega_{FDD2}$, respectively. Hence, each direction (up and down) of each side channel link provides a local communication channel that is different from every other channel and from the common LO frequency. We refer to the schemes where at least some (or all) of the side channel links between a master node and slave nodes operate on different frequencies as Frequency Division Duplexing or FDD. FDD includes, but does not necessarily require, that one or more side channel links communicate in the up direction using a frequency different from the frequency used in the down direction.

In principle, this may allow local array alignment/synchronization to be performed 2(N−1) times faster than in the case of round-robin alignment/synchronization. (Here as elsewhere in this document, N is the number of the nodes of the array.)

Figure 5:
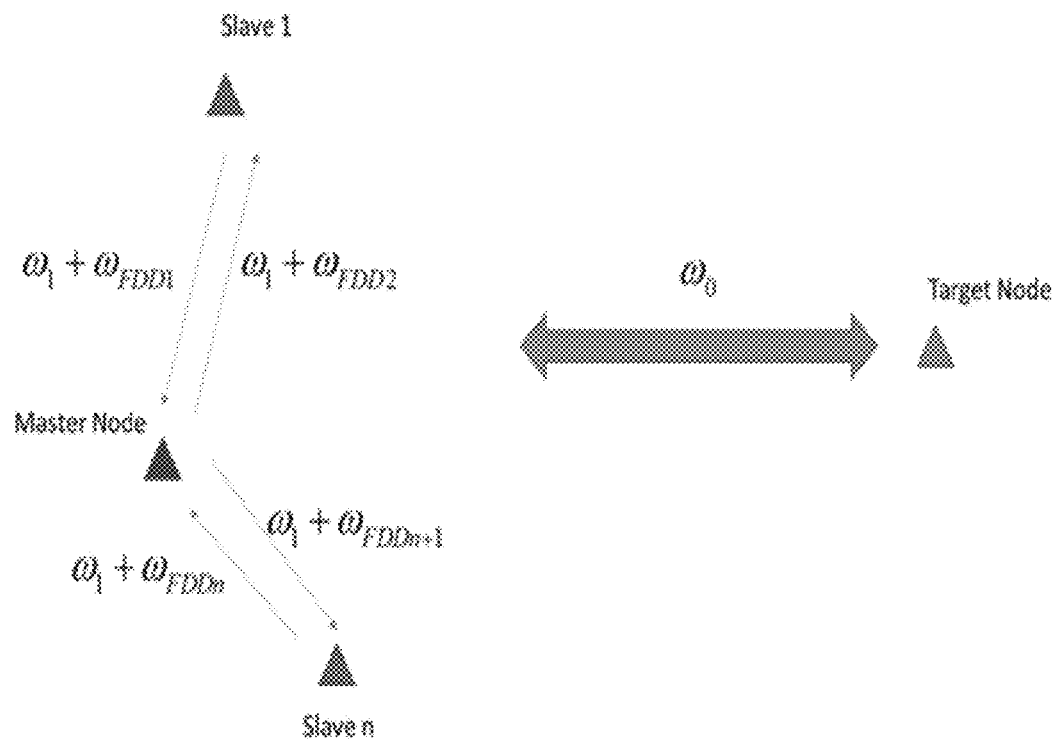
FIG. 5 illustrates selected aspects of communications between nodes of an array using different subcarrier frequencies.

In variants of this scheme, each slave node to master node side channel link uses the same carrier frequency $\omega_1$, but implements the signals used in the local alignment/synchronization process with different subcarrier frequencies. This is illustrated in FIG. 5. As shown, $\omega_1$ is the actual LO frequency, but it could also be a frequency completely different than the LO. This may create more interference between the side channel links, but there are well developed techniques in RF communication theory that allow multiple signals to propagate on a common carrier but maintain independent subchannels, including frequency division multiple access (FDMA) and code division multiple access (CDMA) techniques.

Let us now take a closer look at an example of an FDD local alignment/synchronization process that will help in understanding the requirements imposed on such process by the array-target communication channel. Ultimately, the synchronization requirements for the array may be determined by what is needed from the array to perform the coherent Time-Reversal process of the array on the external channel to the target, or for the array to perform directional beamforming in the direction of the target. In the notation of this example, as in earlier examples, the frequency on which the array-target channel operates is designated by $\omega_0$, and the frequency to which the LOs of the slave nodes are aligned as $\omega_1$. Additionally, the sounding signal emitted by the target is described by $s(t)=A(t)\cos(\omega_0 t)$; this signal has been captured in a capture window by all the nodes of the array after propagating to each node. Each of the array nodes re-emits the capture window (which contains the captured sounding signal) using time reversal, in a manner that allows it to propagate back to the target such that the signals will be temporally and spatially focused on the target, thus enabling fully coherent summation of the signals. This has already been described above as well as in the related patent documents.

It can be shown that the signal arriving back at the target node can be described by the following equation (Equation 1):

$$s(t) = \sum_{i=1}^{N} G_i^{MP} A_i((2T+\partial t_i) + m(\Delta t + \partial t_i) - t)$$

$$\cos(\omega_0 t - (\omega_0 - \omega_i)((2T+\partial t_i) + m(\Delta t + \partial t_i)) + \theta_i).$$

In this equation, the subscript "i" denotes the channel between the target and the ith node of the array; the term $G_i^{MP}$ denotes multipath gain which arises from the time reversal process which can automatically remove the temporal spread from a multipath signal and convert it to gain; the term $A_i((2T+\partial t_i)+m(\Delta t+\partial t_i)-t)$ denotes amplitude of the ith signal as it arrives back at the target node; the delay 2T results from the TR process using a "Capture Window" that is T units in length; the term $\partial t_i$ represents any deviation from perfect alignment of the clocks at each array node; the term $m(\Delta t+\partial t_i)$ denotes additional delay if the TR process also applies data modulation to the signal; $\Delta t$ denotes the bit period and m denotes the mth bit of the data sequence transmitted from the array to the target; and the term $\cos(\omega_0 t-(\omega_0-\omega_i)((2T+\partial t_i)+m(\Delta t+\partial t_i))+\theta_i)$ denotes the different carrier frequency terms of the returning signal with phase offset terms included.

It can be observed from Equation 1 that the independent clocks used at array nodes create a problem where they impose a phase misalignment term that is unique to each array node. The term $(\omega_0-\omega_i)((2T+\partial t_i)+m(\Delta t+\partial t_i))$ is a phase offset than can be removed entirely if all the slave nodes and the master node have a frequency equal to $\omega_0$, in which case the array is a homodyne array. In this case, $(\omega_0-\omega_i)((2T+\partial t_i)+m(\Delta t+\partial t_i))=0$. But this does not eliminate the phase error $\theta_i$ and requires that each array be brought into phase synchronization. Moreover, it may be preferable to avoid an alignment/synchronization process that is non-local, such as would be needed to align/synchronize the array to the remote target. This may be for a variety of reasons. For example, the target node may be non-cooperative and unable/unwilling to participate in an alignment process. Also it may be desired to synchronize the array in anticipation of using it as a coherent array, thus doing so before a target has been identified. So, let us assume that $\omega_i=\omega_1\neq\omega_0$. We will also assume that $\partial t_i$ can be made arbitrarily small and can be ignored in the $(2T+\partial t_i)$ term. The term $m(\Delta t+\partial t_i)$, however, is an error that increases with every data bit m. In practice, careful design of the time synchronization process can ensure that although $\partial t_i\neq 0$, it can be made so that on average $\overline{\partial t_i}=0$.

We also assume that the term $\theta_i$ (which represents the intrinsic phase of the Local Oscillator at the ith node) is such that $\theta_i\rightarrow\theta$, meaning that the phases have been aligned to a common phase offset by the local alignment/synchronization process. Thus, the phase term becomes $(\omega_0-\omega_1)(2T+m\Delta t)+\theta$, which is a constant phase offset that is identical for each signal arriving at the target from each node of the array, allowing the signals to combine and add coherently. By contrast, if the phase terms are different for the different nodes, under certain conditions the signals arriving at the target can cancel each other, resulting in fading. Even if complete fading does not occur, the signal would experience a random amount of unrecoverable fading. Hence the local alignment/synchronization process should align/synchronize the frequencies and the phases of the nodes. In sum, the local alignment/synchronization process should result in (1) $\omega_i \to \omega_1$, and (2) $(\omega_0-\omega_i)((2T+\partial t_i)+m(\Delta t+\partial t_i)+\theta_i) \to (\omega_0-\omega_1)(2T+m\Delta t)+\theta$. In other words, the time of emission from the individual nodes should be approximately the same, the frequencies w, of the LOs of the individual nodes should be approximately the same, and the phases of the signals transmitted by the individual nodes to the target in the course of the collaborative TR communications should be approximately the same.

Next, an exemplary FDD alignment/synchronization process and an exemplary apparatus for the process are described. Selected components and features of the apparatus are illustrated in FIG. 6, which shows a slave node 610 on the left communicating with a master node 650 on the right through a propagation channel 698.

The slave node 610 has an LO or a local clock described by $s_0(t) = \gamma_S(t)\cos(\omega_S t + \phi_S)$. (If this equation describes the clock of the slave node, then the actual LO used to generate the external carrier frequency is derived from this signal, e.g., by frequency multiplication.) The signal $s_0(t)$ is generated by a first slave node generator 612 and an adjustable phase shifter 614. The signal $s_0(t)$ is placed on an FDD carrier of the slave node generated by a second slave node generator 616. The FDD carrier is described by $\cos(\omega_{FDD1}t+\phi_{up})$. For the purposes of this example, the signal $s_0(t)$ is amplitude modulated onto the FDD carrier using a mixer 618, but other forms of modulation may also be used. The output of the mixer 618, is described by this equation: $s(t)=(1+\gamma_S(t)\cos(\omega_S t+\phi_S))\cos(\omega_{FDD1}t+\phi_{up})$. The s(t) signal propagates to the master node 650 through the channel 698.

At the master node 650, the signal is detected and the carrier at FDD1 is removed using any method for extracting the payload from a carrier. As shown in FIG. 6, the signal is mixed by a mixer 652 with an oscillator (not shown) at the frequency FDD1, and filtered by a bandpass filter 654 centered approximately at the LO frequency $\omega_S$ of the slave node 610. This process may employ standard in-phase and quadrature detection techniques if these are required to avoid fading, but they are not shown here for simplicity. The center frequency of the filter 654 may be adjustable/programmable, particularly if the exact frequency $\omega_S$ of the LO of the slave node 610 is not known. Other methods for removing an underlying carrier frequency may also be used. In this way, at the output of the filter 654 a signal described by $p(t)=a_S(t)\cos(\omega_S(t-\tau_{SM})-\phi_S)$ is obtained. In this last equation, the term $a_S(t)$ contains the propagation loss through the channel 698, and the term $\tau_{SM}$ is the delay of the channel 698 between the slave node 610 and the master node 650. These terms are generally different for the different slave nodes, because the propagation channels between the slave nodes and the master node 650 are generally node-dependent and therefore different.

Figure 6:
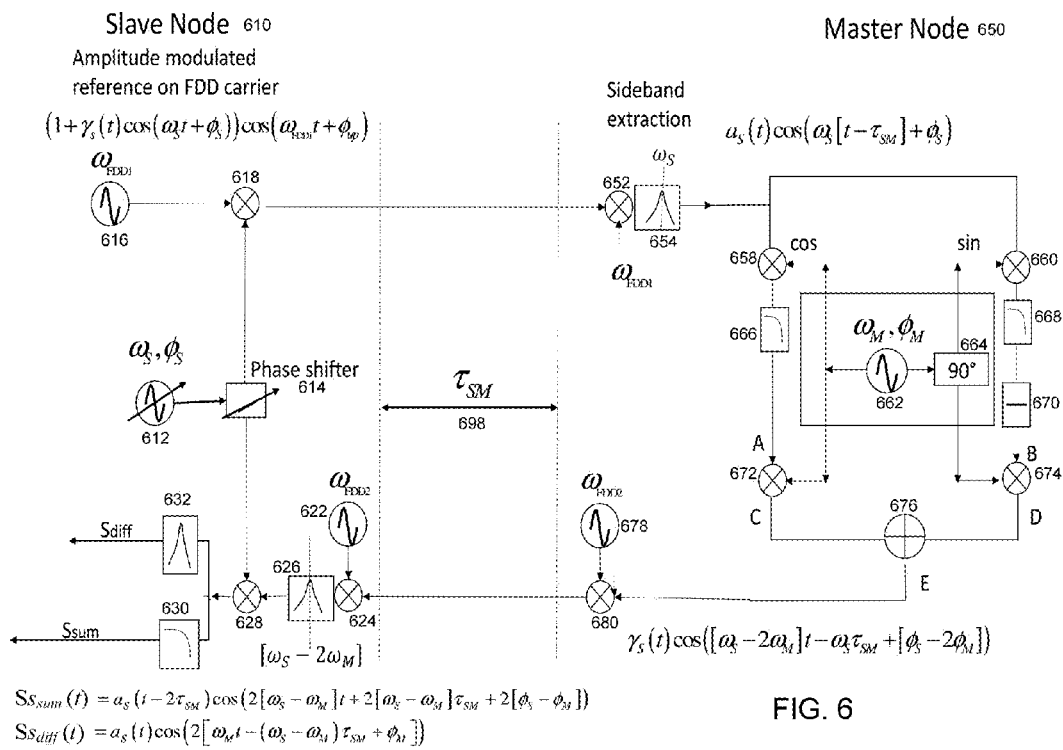
FIG. 6 illustrates selected elements used in node alignment/synchronization.

The signal p(t) is then processed by the master node 650, as shown on the right side of FIG. 6. It is split into a first and second substantially identical components (splitter not shown), which are fed into mixers 658 and 660, respectively, for in-phase and quadrature (I/Q) processing. In the mixer 658, the first component is multiplied by a cosine version of a signal generated by a first master node generator 662; this signal is described by $\cos(\omega_M t+\phi_M)$. Similarly, the second component is multiplied by a sine version of the same signal which is described by $\sin(\omega_M t+\phi_M)$. The sine version may be generated from the cosine version by a 90° phase shifter 664. For convenience, the amplitudes of the cosine and sine versions may be normalized to unity.

The outputs of the mixers 658 and 660 are passed through low-pass filters 666 and 668, respectively, to isolate the frequency difference terms and eliminate the sum terms. The signal at the output of the LP filter 666 may be described by the following equation: $q_I(t)=a_S(t)\cos(\omega_S(t-\tau_{SM})+\phi_S)\cos(\omega_M t+\phi_M)=\frac{1}{2}a_S(t)\cos([\omega_S-\omega_M]t-\omega_S\tau_{SM}+(\phi_S-\phi_M))$. The signal at the output of the LP filter 668 may be described by the following equation: $q_Q(t)=a_S(t)\cos(\omega_S(t-\tau_{SM})+\phi_S)\sin(\omega_M t+\phi_M)=-\frac{1}{2}a_S(t)\sin([\omega_S-\omega_M]t-\omega_S\tau_{SM}+(\phi_S-\phi_M))$.

The output of the LP filter 668 (the quadrature term) has its sign reversed by a block 670 and is once again mixed with the sine version from the master node oscillator 664, in a mixer 674. The output of the LP filter 666 is mixed with the cosine version of the signal generated by the first master node generator 662, in a mixer 672. The outputs of the mixers 672 and 674 are described by these equations: $r_I(t)=\frac{1}{4}a_S(t)[\cos([\omega_S-2\omega_M]t-\omega_S\sigma_{SM}+[\phi_S-2\phi_M])+\cos(\omega_S(t-\tau_{SM})+\phi_S)]$, and $r_Q(t)=\frac{1}{4}a_S(t)[\cos([\omega_S-2\omega_M]t-\omega_S\sigma_{SM}+[\phi_S-2\phi_M])-\cos(\omega_S(t-\tau_{SM})+\phi_S)]$. These signals are summed in an adder 676, resulting in an output that varies with the phase and frequency differences between the first master node generator 662 and the first slave node generator 612: $r_I(t)+r_Q(t)=\frac{1}{2}a_S(t)[\cos([\omega_S-2\omega_M]t-\omega_S\tau_{SM}+[\phi_S-2\phi_M])]$.

A second FDD carrier $\omega_{FDD2}$ is generated by a second master node generator 678, and amplitude modulated in a mixer 680 by the signal outputted by the adder 676. The resulting signal at the output of the mixer 680, described by $\gamma(t-\tau_{SM})\cos([\omega_S-S\omega_M]t-\omega_S\tau_{SM}+[\phi_S-2\phi_M])\cos(\omega_{FDD2}t+\phi_{dn})$, is transmitted from the master node 650 back to the slave node 610. After this latter signal propagates through the channel 698 to the slave node 610, the slave node 610 removes the FDD2 carrier using any conventional method for extracting the payload from a carrier. As shown in the Figure, the carrier removal is performed by mixing the signal in a mixer 624 with a frequency FDD2 derived from a third slave node generator 622 and bandpass filtering the received signal with a bandpass filter 626 (centered approximately at the frequency $(\omega_S-2\omega_M)$). It should be understood that conventional in-phase and quadrature techniques may be applied here but are not shown to simplify the description. Other techniques for removing a payload from a carrier may also be acceptable. The output of the band-pass filter 626 is described by: $a(t)\cos([\omega_S-2\omega_M](t-\tau_{SM})-2[\omega_S-\omega_M]\tau_{SM}+[\phi_S-2\phi_M])$. This signal is mixed in a mixer 628 with the output of the adjustable phase shifter 614, to obtain a signal described by this equation: $a(t-2\tau_{SM})\cos([\omega_S-2\omega_M](t-\tau_{SM})-2[\omega_S-\omega_M]\tau_{SM}+[\phi_S-2\phi_M])\cos(\omega_S t+\phi_S)$. The output of the mixer 628 is filtered in a bandpass filter 632 to obtain a difference term $s_{Sdiff}(t)=a_S(t)\cos(2[\omega_M t-(\omega_S-\omega_M)\tau_{SM}+\phi_M])$; and by a highpass filter 630 to obtain a sum term $s_{Ssum}(t)=a_S(t-2\tau_{SM})\cos(2[\omega_S-\omega_M]t+2[\omega_S-\omega_M]\tau_{SM}+2[\phi_S-\phi_M])$.

Since the sum term contains $2[\omega_S-\omega_M]t$, it enables the slave node 610 to eliminate the frequency difference. As $\omega_S$ is adjusted (e.g., by tuning the first slave node generator 612), this fluctuating term vanishes when $\omega_s=\omega_M$. Hence this process allows synchronization of the frequencies by measuring the beat signal between them, and adjusting $\omega_s$ so that $[\omega_S-\omega_M] \to 0$ and the signal remains constant. This also eliminates the heterodyne phase term $2[\omega_S-\omega_M]\tau_{SM} \to 0$ by default, leaving the term of $2[\phi_S-\phi_M]$ which is the static phase differences of the two references 612 and 662.

One practical option to equalize the phases is by maximizing the $a_S(t-2\tau_{SM})\cos(2[\phi_S-\phi_M])$ term.

Another practical option is alignment by nulling a signal. A small pilot oscillation is added to the $\phi_S$, i.e., to the phase of the first slave node generator 612, $\phi_S \rightarrow \phi_S + \Delta\Phi \cos(\omega_p t)$. Hence the monitored phase term then becomes:

$$a_S(t-2\tau_{SM})\cos(2[(\phi_S+\Delta\Phi\cos(\omega_p t))-\phi_M])=a_S(t-2\tau_{SM})\cos(2[\phi_S-\phi_M]+2\Delta\Phi\cos(\omega_p t)).$$

When $\phi_S - \phi_M \rightarrow 0$, a term $\cos(2\Delta\Phi \cos(\omega_p t)) \rightarrow 1 - (2\Delta\Phi \cos(\omega_p t))^2$ is left. This pilot tone is nulled at the frequency $\omega_P$ when $[\phi_S - \phi_M] = 0$, since all the energy is moved to the higher harmonics due to the squared term.

In the examples given throughout this document, it is the master node that is aligning/synchronizing the clocks at the slave nodes with its own clock. In variants, however, the master node and one or more slave nodes align/synchronize to a common external reference clock; although this will not be "local" alignment/synchronization, the same or analogous techniques may be used. Moreover, the role of the master node, that is, the node that directs the alignment/synchronization operations and/or distributes across the array the data to be transmitted to the target, may be assigned to different nodes of the array at different times. In embodiments, the role of the master node may be assigned to different nodes depending on their physical position relative to other nodes of the array. For example, the master node may be selected to be the node that is closest to the geometric center of gravity of the array, giving equal weight to each of the array nodes. The master node may be selected from among the nodes that are capable of communicating with all the other nodes of the array over the side channel links, and the selection of a new master node may be triggered as the current node loses access to one (or another predetermined number) of the other nodes of the array over the side channel links. Here, "loses access" means that at least one metric representative of the quality of the side channel link, such as signal-to-noise ratio (SNR) or error rate (e.g., bit error rate or BER) fails to meet a predetermine standard. The at least one metric may be derived from multiple other metrics.

In embodiments, two or more nodes of the array concurrently perform some functions of the master node. For example, one master node can align/synchronize a second master node (and possibly one or more of the remaining nodes) to itself, and the second master node can then align/synchronize some or all of the remaining nodes of the array to itself. Data to be collaboratively transmitted from the array may be distributed across the array by one master node or jointly by multiple master nodes, and/or by one or more slave nodes. Generally, a master node is a node to which one or more other nodes are aligned/synchronized.

The local alignment/synchronization process may be carried out completely independently of the intended target. Indeed, it can be performed even if no target is present. Hence the array can be held in a "state-of-readiness" where it has performed the local alignment technique and is simply waiting for a sounding signal to be emitted from a target of interest so that it can then apply TR to return the signal in a coherent and focused manner to the target. Moreover, the array may be held in such state-of-readiness after the receipt of the sounding signal, awaiting some other trigger event, such as availability of data for transmission to the target.

Whether the array of ad hoc nodes is aligned/synchronized using TDD or FDD, there is no requirement that the slave nodes immediately implement the required changes determined during the synchronization process. Different modes of operation are possible. For example, during the initial power up and first use of the array, there may be no reason to delay the implementation of the local changes required for synchronization at each slave node as the changes required for alignment/synchronization are determined at each slave node. During subsequent operation of the array, however, it may be desirable to wait for some event before implementing the changes required for synchronization. Thus, for round-robin TDD or FDD alignment/synchronization, the slave nodes may compute and record the required changes, but wait until the alignment process is complete before implementing the changes. This would allow a one-time disruption of the external operation of the array as the frequencies are modified. For FDD, the alignment/synchronization process may be carried out in parallel, but in some embodiments the array may still implement the required changes upon occurrence of some trigger event, such as availability of data for transmission to the target.

Some definitions have been explicitly provided in this document. Other and further implicit definitions and clarifications of definitions may be found throughout this document.

While the examples in this document focus on transmission from the array of untethered ad hoc nodes to one or more targets (transmit mode), analogous alignment of untethered ad hoc nodes of an array may also serve to receive a transmission from the target to the array (receive mode). Furthermore, examples of inter-nodal communications may be useful for other nodes, such as nodes that are tethered, that is, nodes that are generally stationary with respect to each other, but which have individual clocks. The RF channels between such nodes may be varying, for example, due to changes in the environment surrounding the nodes, such as movement of objects that cause signal reflections, signal phase shift, and signal attenuation.

The features described throughout this document may be present individually, or in any combination or permutation, except where the presence or absence of specific elements/limitations is inherently required, explicitly indicated, or otherwise made clear from context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for communications and other techniques using distributed cooperating/collaborative nodes. This was done for illustration purposes and, therefore, the foregoing description is not necessarily intended to limit the spirit and scope of the invention(s) described. Neither the specific embodiments of the invention(s) as a whole, nor those of their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of communicating between an array of ad hoc nodes and a target, the array comprising a master node and a plurality of slave nodes, the method comprising steps of:
   communicating between the master node and each slave node of the array to enable synchronization of said each slave node to the master node, the step of communicating with said each slave node being performed on a radio frequency (RF) side channel link associated with said each slave node, wherein a plurality of RF side channel links are established by the array, each RF side channel link operating on an upward frequency for transmissions to the master node and on a downward frequency for transmissions from the master node;
   performing frequency, time, and phase synchronization of said each slave node to the master node based on the step of communicating;
   distributing across the array common data for transmission to the target; and
   coherently transmitting from said each node of the array to the target signals at a common frequency, the signals at the common frequency carrying the common data, the step of coherently transmitting being performed so that the signals at the common frequency carrying the common data add constructively in a general direction from the array to the target and/or in a general location of the target, the step of coherently transmitting comprising directional beamforming or location-focusing using time-reversal;
   wherein:
   the plurality of slave nodes comprises a first slave node associated with a first RF side channel link, and a second slave node associated with a second RF side channel link;
   the first RF side channel link operates from the first slave node to the master node on a first upward band centered round a first upward frequency and from the master node to the first slave node on a first downward band centered round a first downward frequency;
   the second RF side channel link operates from the second slave node to the master node on a second upward band centered round a second upward frequency and from the master node to the second slave node on a second downward band centered round a second downward frequency; and
   at least one band selected from the group consisting of the first upward band, the second upward band, the first downward band, and the second downward band is different from and non-overlapping at least one other band selected from the group.

2. A method as in claim 1, wherein the step of communicating is performed in parallel for at least two slave nodes of the plurality of slave nodes.

3. A method as in claim 1, wherein the step of communicating is performed in parallel for the plurality of slave nodes.

4. A method as in claim 1, wherein at least some of the RF side channel links of the plurality of RF side channel links operate on carrier frequencies and each band of the group is centered round a carrier frequency.

5. A method as in claim 1, wherein at least some of the RF side channel links of the plurality of RF side channel links operate on subcarrier frequencies and each band of the group is centered round a subcarrier frequency.

6. A method as in claim 1, wherein the common frequency is different from upward and downward frequencies of every RF side channel link of the array so that the step of coherently transmitting does not interfere with inter-nodal communications between the master node and the plurality of slave nodes.

7. A method as in claim 1, wherein:
   upward frequency of RF side channel link of said each slave node is different from upward frequency of RF side channel of every other slave node of the array, all upward communications of the array being non-overlapping; and
   downward frequency of RF side channel link of said each slave node is different from downward frequency of RF side channel link of every other slave node of the array, all downward communications of the array being non-overlapping.

8. A method as in claim 1, wherein:
   upward frequency of RF side channel link of said each slave node is different from upward frequency of RF side channel of every other slave node of the array and from downward frequency of every slave node of the array; and
   downward frequency of RF side channel link of said each slave node is different from downward frequency of RF side channel link of every other slave node of the array;
   whereby all upward and downward communications of the array are non-overlapping.

9. A method as in claim 6, wherein the step of coherently transmitting uses time-reversal and the signals at the common frequency carrying the common data add constructively on the target.

10. A method as in claim 1, further comprising keeping the array in a state-of-readiness after the steps of communicating and performing synchronization until occurrence of a predetermined trigger event.

11. An array of nodes for collaborative communication with a target, wherein:

the array comprises a master node and a plurality of slave nodes, the plurality of slave nodes comprising a first slave node and a second slave node;

each node of the array comprises a processor; radio frequency circuitry (RF) operating under control of the processor, and memory coupled to the processor and storing instructions executable by the processor;

the nodes are configured to:
  establish a plurality of RF side channel links, an RF side channel link per slave node, each slave node of the plurality of slave nodes communicating with the master node over the RF side channel link corresponding to said each slave node to enable frequency, time, and phase synchronization of said each slave node to the master node, each RF side channel link of the plurality of side channel links operating on an upward frequency for transmissions to the master node and on a downward frequency for transmissions from the master node, the plurality of RF side channel links comprises a first side channel link corresponding to the first slave node and a second side channel link corresponding to the second slave node,
  perform frequency, time, and phase synchronization of said each slave node to the master node based on the communications over the RF side channel links,
  distribute across the array common data for transmission to the target, and
  coherently transmit from said each node of the array to the target signals at a common frequency, the signals at the common frequency carrying the common data, wherein the signals carrying the common data add constructively in a general direction from the array to the target and/or in a general location of the target, wherein directional beamforming or location-focusing using time-reversal is accomplished;

wherein:
  the first RF side channel link operates from the first slave node to the master node on a first upward band centered round a first a first upward frequency and from the master node to the first slave node on a first downward band centered round a first downward frequency;
  the second RF side channel link operates from the second slave node to the master node on a second upward band centered round a second upward frequency and from the master node to the second slave node on a second downward band centered round a second downward frequency;
  at least one band selected from the group consisting of the first upward band, the second upward band, the first downward band, and the second downward band is different from and non-overlapping with at least one other frequency selected from the group; and said each node of the array is free to move in three dimensions in absolute terms, with respect to the target, and with respect to other nodes of the array; and said each node of the array is free to rotate around a plurality of axes.

12. An array of nodes as in claim 1, wherein the nodes are further configured to enable the plurality of slave nodes to obtain synchronization information in parallel.

13. An array of nodes as in claim 11, wherein at least some of the RF side channel links of the plurality of RF side channel links operate on carrier frequencies and each band of the group is centered round a carrier frequency.

14. An array of nodes as in claim 11, wherein at least some of the RF side channel links of the plurality of RF side channel links operate on subcarrier frequencies and each band of the group is centered round a subcarrier frequency.

15. An array of nodes as in claim 11, wherein the signals at the common frequency carrying the common data coherently transmitted from said each node of the array to the target are time-reversed transmissions that add constructively on the target.

16. An array of nodes as in claim 11, wherein the common frequency is different from upward and downward frequencies of every RF side channel link of the array so that the signals at the common frequency carrying the common data coherently transmitted from said each node of the array to the target do not interfere with inter-nodal communications of the array.

17. An array of nodes as in claim 11, wherein:
  upward frequency of RF side channel link of said each slave node is different from upward frequency of RF side channel of every other slave node of the array and from downward frequency of every slave node of the array, all upward communications of the array being non-overlapping; and
  downward frequency of RF side channel link of said each slave node is different from downward frequency of RF side channel link of every other slave node of the array, all downward communications of the array being non-overlapping.

18. An array of nodes as in claim 17, wherein the common frequency is different from and non-overlapping with upward and downward frequencies of every RF side channel link of the array.

19. An array of nodes as in claim 11, wherein the nodes are further configured to remain in a state-of-readiness after frequency, time, and phase synchronization of said each node, and to coherently transmit in response to occurrence of a predetermined trigger event.

20. An array of nodes as in claim 11, wherein:
  the master node comprises means for synchronizing slave nodes; and
  each slave node comprises means for synchronizing to the master node.

* * * * *